(12) United States Patent
Curtis et al.

(10) Patent No.: US 6,497,448 B1
(45) Date of Patent: Dec. 24, 2002

(54) REARWARD CLOSURE ASSEMBLY FOR AN AUTOMOTIVE VEHICLE

(75) Inventors: Randy C Curtis, Macomb, MI (US); Kevin G. Kolpasky, Sterling Heights, MI (US); Timothy E Okenka, Shelby Township, MI (US); Chris A Olsen, Rochester, MI (US); Timothy C Slanec, Shelby Township, MI (US); Matthew H Szalach, Washington Township, MI (US); Kevin M Hester, Washington, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/999,088

(22) Filed: Nov. 20, 2001

(51) Int. Cl.[7] .................................................. B60J 5/02
(52) U.S. Cl. ..................... 296/146.8; 296/106; 296/108; 296/223
(58) Field of Search ............................... 296/146.8, 108, 296/106, 146.2, 216.04, 146.16, 155, 224, 107.09, 223, 146.14, 217, 219, 218; 220/213

(56) References Cited

U.S. PATENT DOCUMENTS

| | | | | |
|---|---|---|---|---|
| 1,940,444 A | * | 12/1933 | Burgman | 296/108 |
| 3,158,397 A | * | 11/1964 | Peras | 296/106 |
| 3,357,738 A | * | 12/1967 | Bourlier | 296/108 |
| 3,542,417 A | * | 11/1970 | Mohs | 296/146.2 |
| 3,567,209 A | * | 3/1971 | Lathers | 296/106 |
| 3,645,043 A | * | 2/1972 | Velavicius et al. | 296/106 |
| 3,827,182 A | * | 8/1974 | Van Helleputte | 220/213 |
| 4,184,709 A | * | 1/1980 | Kim | 296/146.8 |
| 4,272,121 A | * | 6/1981 | Kim | 296/216.04 |
| 4,415,195 A | * | 11/1983 | Furukawa et al. | 296/146.16 |
| 4,620,748 A | * | 11/1986 | Heintzmann et al. | 198/735.3 |
| 4,801,172 A | * | 1/1989 | Townsend | 296/155 |
| 4,801,174 A | * | 1/1989 | Hirshberg et al. | 296/146.8 |
| 4,968,089 A | * | 11/1990 | Murai et al. | 296/224 |
| 5,052,747 A | * | 10/1991 | Kubota et al. | 296/107.09 |
| 5,242,210 A | * | 9/1993 | Fujisawa et al. | 296/223 |
| 5,470,126 A | * | 11/1995 | Hines, Jr. | 296/223 |
| 5,558,388 A | * | 9/1996 | Furst et al. | 296/146.14 |
| 5,836,643 A | * | 11/1998 | Preiss | 296/217 |
| 5,921,611 A | * | 7/1999 | Townsend | 296/146.8 |
| 5,944,378 A | * | 8/1999 | Mather et al. | 296/146.14 |
| 5,951,100 A | * | 9/1999 | Ewing et al. | 296/223 |
| 6,033,012 A | * | 3/2000 | Russke et al. | 296/219 |
| 2001/0040394 A1 | * | 11/2001 | DeGaillard | 296/218 |

FOREIGN PATENT DOCUMENTS

| | | | |
|---|---|---|---|
| JP | 64 32921 | * | 2/1989 |
| JP | 1 202522 | * | 8/1989 |
| JP | 2 77325 | * | 3/1990 |

* cited by examiner

*Primary Examiner*—Kiran Patel
(74) *Attorney, Agent, or Firm*—Laura C. Hargitt

(57) ABSTRACT

There is disclosed a rearward closure assembly for an automotive vehicle. The assembly includes a rear panel and a rearward roof panel that can be moved along track guides that extend from a rear portion of the vehicle to the top of the vehicle. The rear panel can be translated from a first position to a second position such that the rear panel and roof panel are generally opposing and parallel to each other to open a lower portion of a rearward passageway of the vehicle. Thereafter, the rear panel and the roof panel can be translated above a top portion of the vehicle to open an upper portion of the rearward passageway.

6 Claims, 6 Drawing Sheets

REARWARD CLOSURE ASSEMBLY FOR AN AUTOMOTIVE VEHICLE

TECHNICAL FIELD

The present invention relates to a rearward closure assembly for an automotive vehicle.

BACKGROUND OF THE INVENTION

It is known in automotive vehicles to employ hinged closure panels for providing access to the cabin of the vehicle through a rearward passageway of the vehicle. It is also known that the panels are typically hinged along one of their edges for swinging rotation about an axis substantially coincidental with such edge. Such hinged closure panels thus require clearance space into which panels may swing thereby limiting the practical location where such vehicles can be used. Therefore, it is desirable to provide a rearward closure assembly that requires reduced clearance space for opening and closing.

SUMMARY OF THE INVENTION

The present invention is for a rearward closure assembly for selectively opening and closing a rearward passageway of an automotive vehicle. The automotive vehicle includes a top portion, a first and second side portion and a rear portion wherein the rear portion includes a rearward passageway. The closure assembly includes a first and second track guide, a generally rectangular rear panel, a generally rectangular rearward roof panel and a motor. The first track guide extends generally parallel and adjacent to the first side portion of the vehicle and extends from the top portion of the vehicle to the rear portion of the vehicle. The second track guide extends generally parallel and adjacent to the second side portion of the vehicle and extends from the top portion of the vehicle to the rear portion of the vehicle. The rear panel and the roof panel are supported by the first and second track guides. The rear panel is moveable along the track guides from a first flush position covering a lower portion of the passageway to a second position generally opposing the roof panel thereby opening the lower portion of the passageway. The rear panel is further moveable along the track guides from the second position to a third position generally opposing the top portion of the vehicle. The roof panel is moveable from a first flush position covering an upper portion of the passageway to a second position generally opposing the top portion of the vehicle thereby opening the upper portion of the passageway. The motor is suitably linked to at least one of the rear and roof panels for assisting in moving the at least one of the rear and roof panels to its respective positions.

BRIEF DESCRIPTION OF THE DRAWINGS

These and other objects, features, aspects, and advantages of the invention will become apparent upon consideration of the specification and appended drawings in which.

DESCRIPTION OF THE PREFERRED EMBODIMENT

Figure 1:
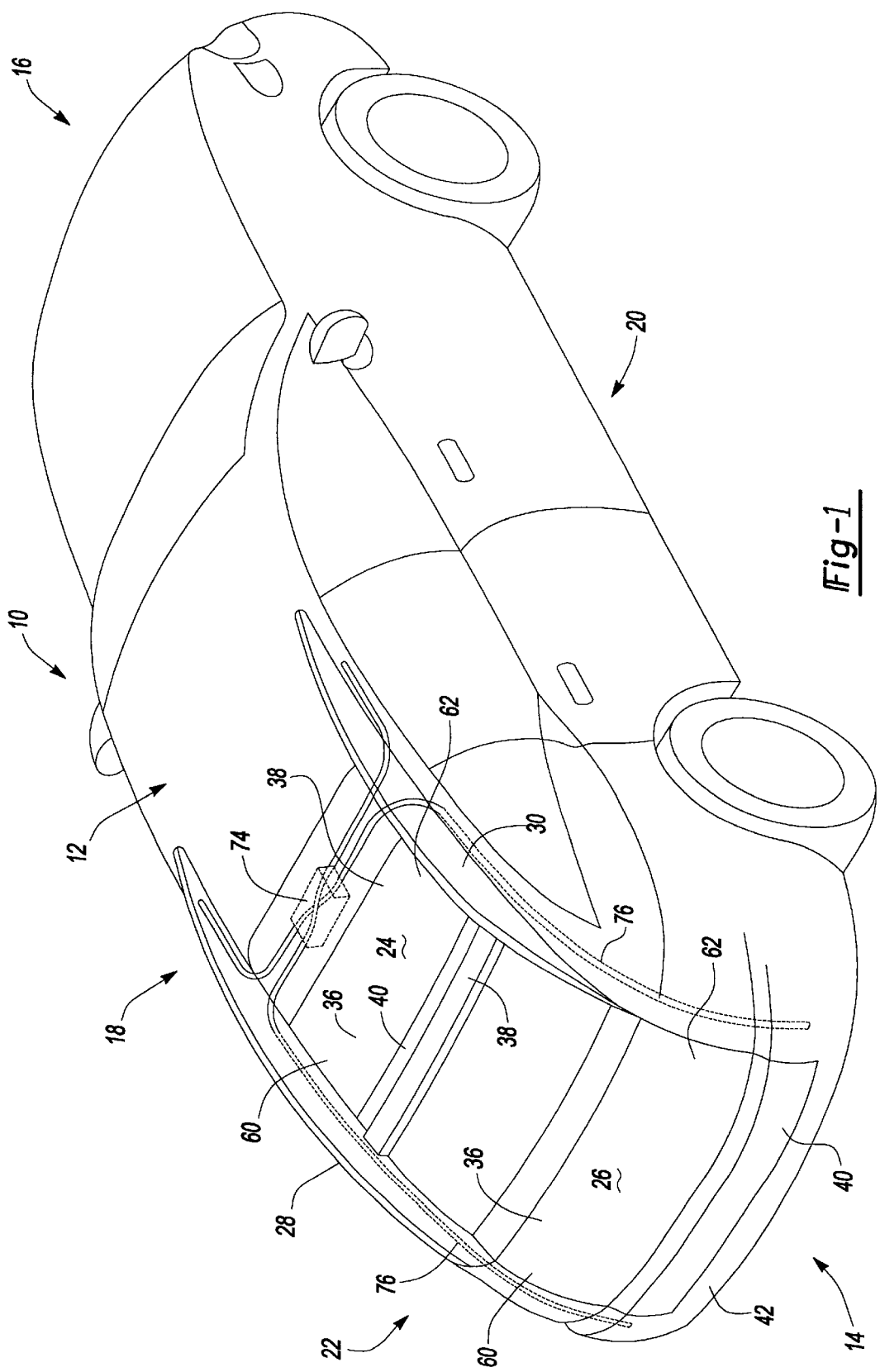
FIG. 1 illustrates a perspective view of an automotive vehicle having a rearward closure assembly.

Referring now to FIGS. 1–4, there is illustrated an automotive vehicle 10 having a top portion 12, a rear portion 14, a front portion 16, a first side portion 18 and a second side portion 20. The vehicle 10 includes a rearward closure assembly 22 including a rectangular rearward roof panel 24 and a rectangular rear panel 26. Each of the panels 24, 26 is moveable along a pair of spaced apart opposing track guides 28, 30 for opening and closing a rearward passageway 32 of the vehicle 10.

Figure 2:
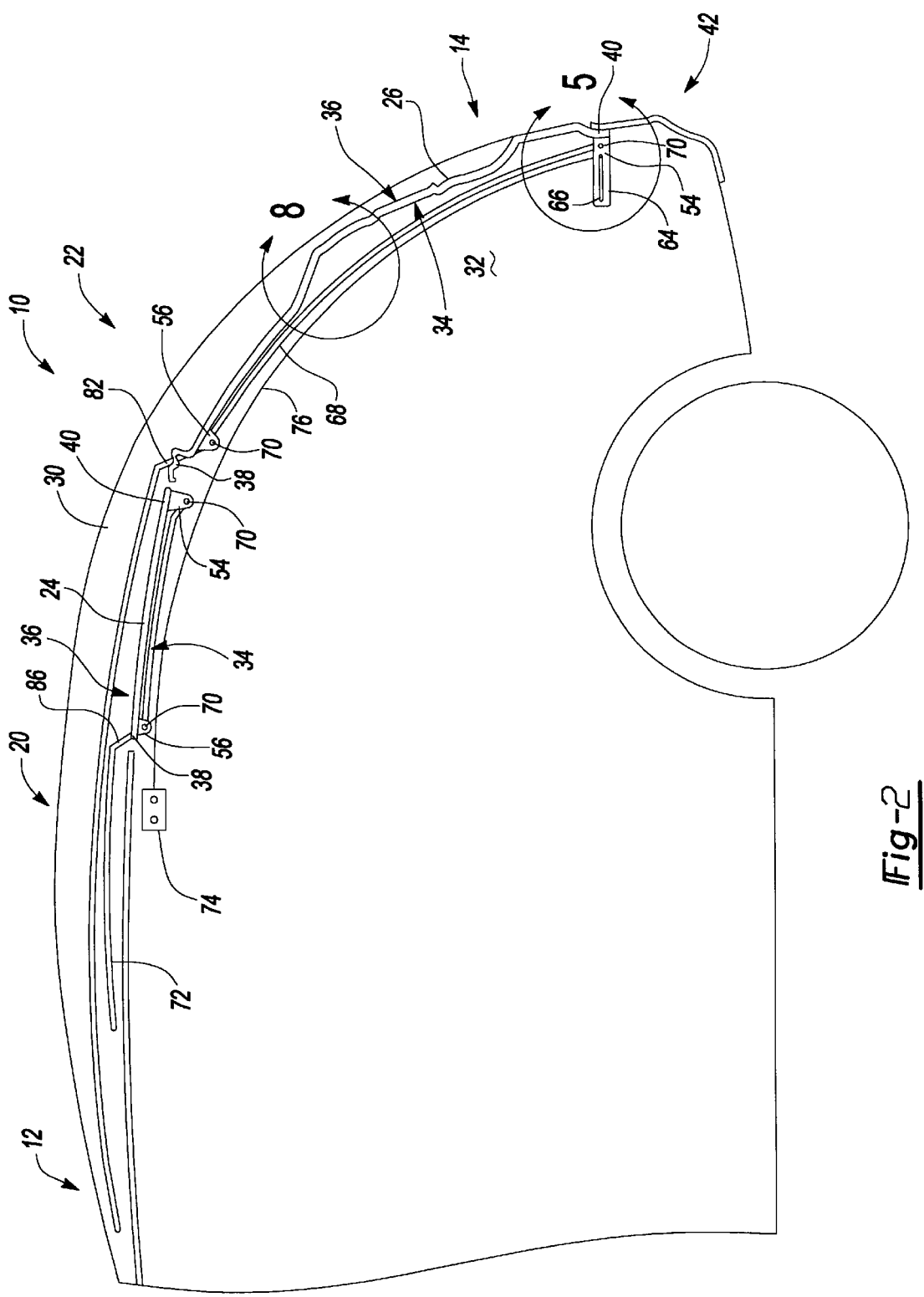
FIG. 2 illustrates a partial sectional side view of the rearward closure assembly of FIG. 1 in a closed position.

In a first closed position shown in FIGS. 1 and 2, the rear panel 26 is fit flush to the vehicle 10 over a lower portion of the rearward passageway 32 and the roof panel 24 is fit flush to the vehicle 10 over an upper portion of the rear passageway 32 and flush relative to the rear panel 26. Each of the panels 24, 26 includes an inwardly facing side 34 facing toward the interior of the vehicle 10 and an outwardly facing side 36 facing away from the vehicle 10. Each of the panels 24, 26 further includes a leading edge 38 opposite a trailing edge 40. In the closed position, the trailing edge 40 of the rear panel 26 is adjacent a lower rear portion 42 (e.g., a bumper assembly) of the vehicle 10. The leading edge 38 of the rear panel 26 adjoins the trailing edge 40 of the roof panel 26 and the leading edge 38 of the roof panel 24 adjoins the top portion 12 of the vehicle 10.

Figure 8:
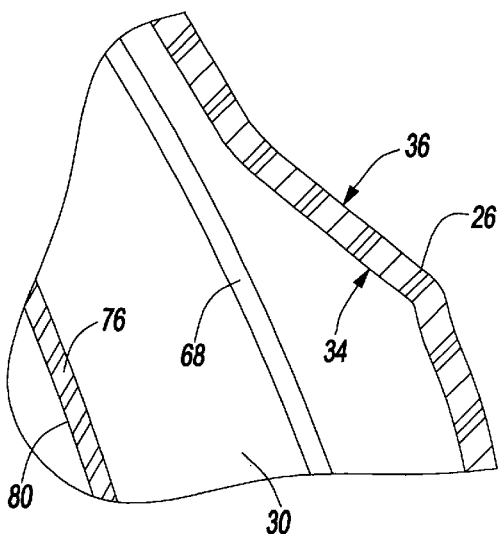
FIG. 8 illustrates a partial sectional side view of a portion of a rear panel of the rearward closure assembly as circled and labeled with an 8 in FIG. 2.
Figure 9:
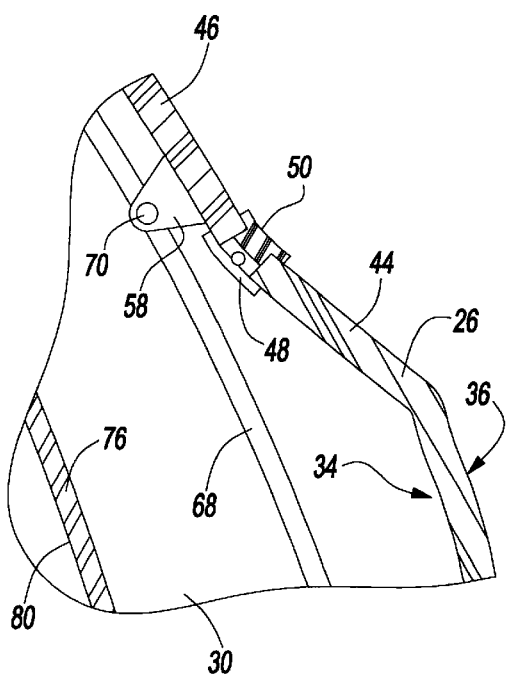
FIG. 9 illustrates a partial sectional side view of the portion of the rear panel of FIG. 8 in an alternative form.

As shown in FIG. 9, the rear panel 26 can include a lower panel portion 44 hingedly attached to a upper panel portion 46 with one or more hinges 48 that are protected from the exterior environment of the vehicle 10 by an optional flexible seal 50 that is at least partially located between the panel portions 44, 46 allowing relative movement between the panel portions 44, 46. Alternatively, the rear panel 26 may be entirely substantially rigid as shown in FIG. 8.

Figure 3:
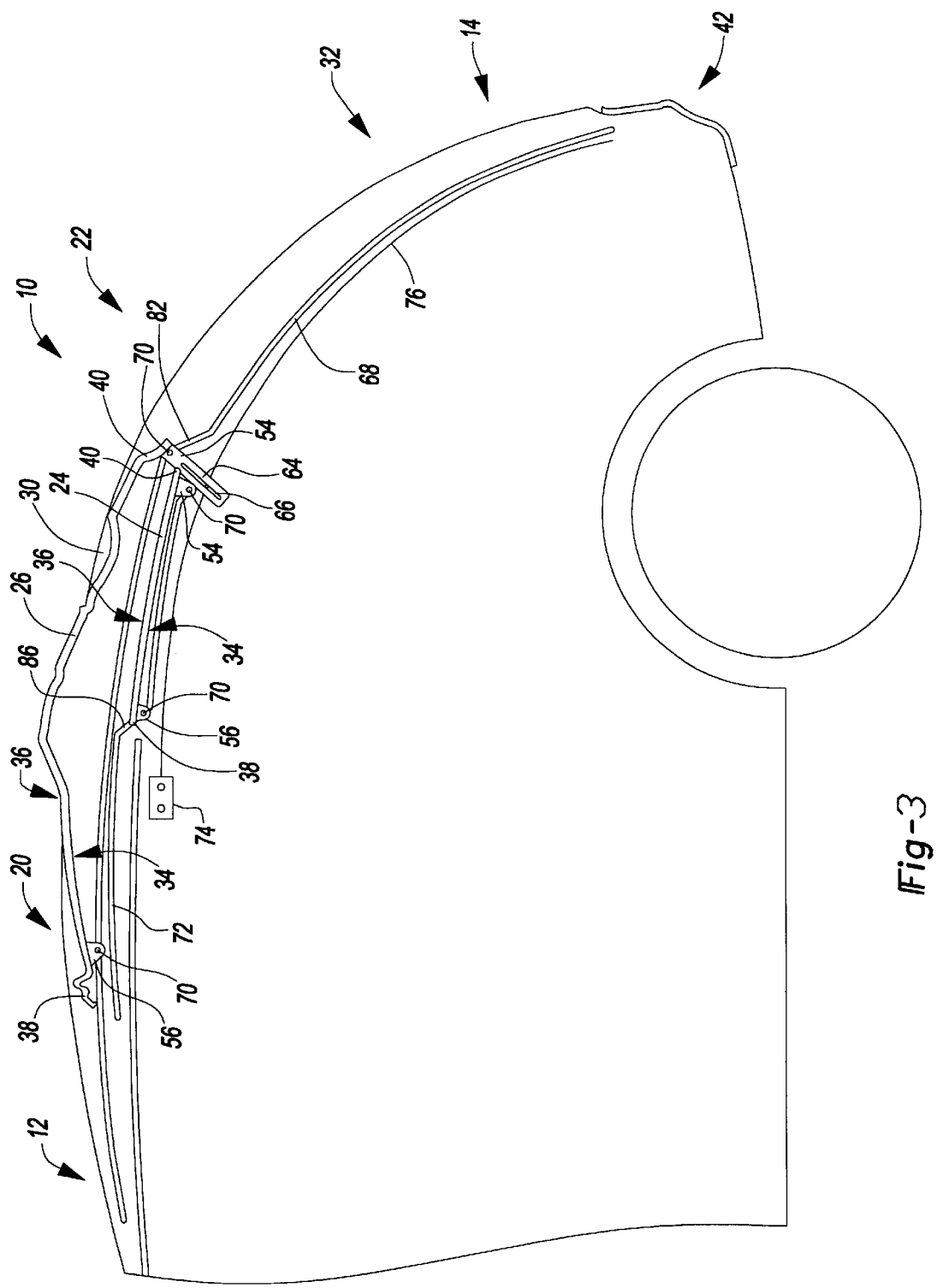
FIG. 3 illustrates a partial sectional side view of the rearward closure assembly of FIG. 1 in a partially opened position.
Figure 4:
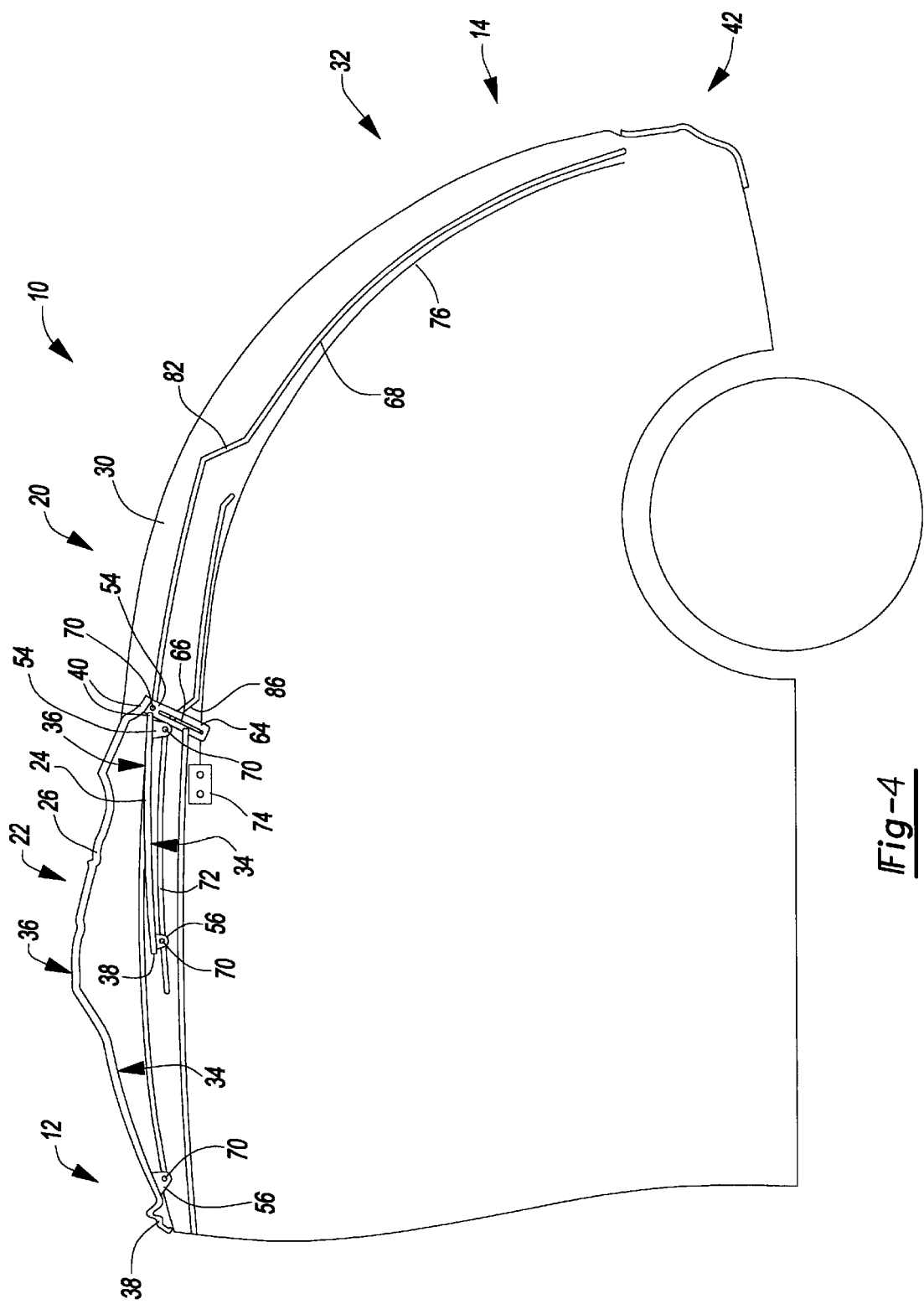
FIG. 4 illustrates a partial sectional side view of the rearward closure assembly of FIG. 1 in a fully opened position.
Figure 5:
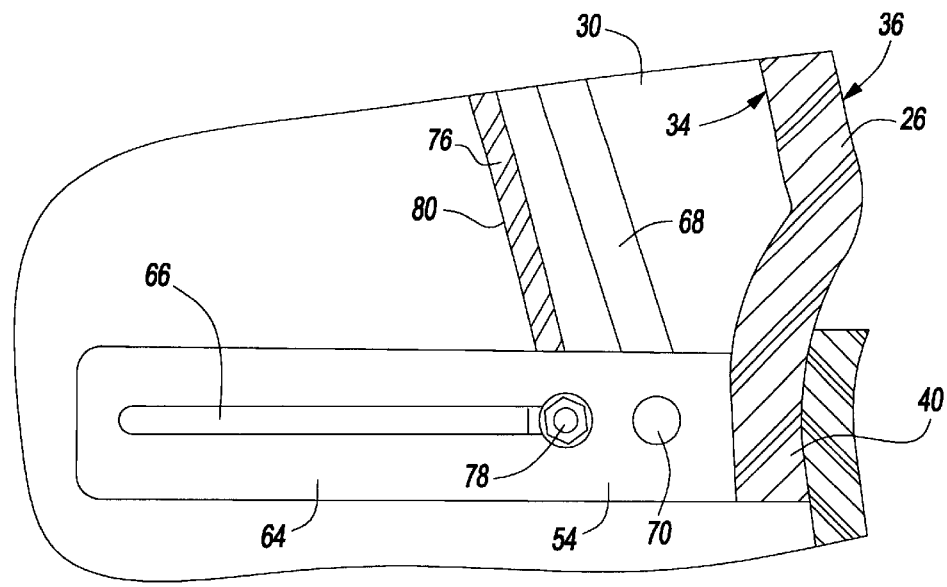
FIG. 5 illustrates a magnified partial sectional side view of a support of the rearward closure assembly as circled and labeled with a 5 in FIG. 2.

Referring to FIGS. 1–4 and 5, a pair of rearward supports 54 is adjacent the trailing edge 40 of both the roof panel 24 and the rear panel 26, a pair of forward supports 56 is adjacent the leading edges 38 of the panels 24, 26 and a pair of central supports 58, shown in FIG. 9, is adjacent the flexible seal 50 if the rear panel 26 includes the top and bottom portion 46, 44. In FIGS. 2–4, only one of each pair of rearward, forward and central supports 54, 56, 58 is shown. However, it shall be recognized that one of each pair of supports 54, 56, 58 is adjacent to one side edge 60 of its respective panel 24, 26 and one of each pair of supports 54, 56, 58 is adjacent an opposing side edge 62 of its respective panel 24, 26, wherein the side edges 60, 62 of each panel 24, 26 are shown clearly in FIG. 1. As shown in FIGS. 2–7, the rearward supports 54 of the rear panel 26 include elongated rigid portions 64 with lengths of the portions 64 extending toward the interior of the vehicle and slots 66 extending along the lengths.

In FIGS. 1–4, the panels 24, 26 are supported by the first track guide 28 and the second track guide 30. The first track guide 28 extends adjacent the first side portion 18 of the vehicle 10 and opposes the second track guide 30, which extends adjacent the second side portion 20 of the vehicle 10. Each of the track guides 28, 30 extend longitudinally with the vehicle 10 from the lower rear portion 42 of the vehicle 10 to a location along the top portion 12 of the vehicle 10.

As shown in FIGS. 2–9, a first pair of substantially similar opposing grooves 68 (only one of which is shown) extends along the track guides 28, 30 with one of the grooves 68 in each of the track guides 28, 30. The grooves 68 receive a guide member 70 (e.g., a pin) of each pair of supports 54, 56, 58 of the rear panel 26. The guide members 70 are slidably or moveably fit within the grooves 68 to allow the rear panel 26 to move along the guide tracks 28, 30. Preferably, the first pair of opposing grooves 68 extends from at least partially above the top portion 12 to the bumper 42.

A second pair of substantially similar opposing grooves 72 (again, only one of which is shown) extends along the track guides 28, 30 again with one of the grooves 72 in each track guide 28, 30. The grooves 72 receive a guide member 70 (e.g., a pin) of each pair of supports 54, 56 of the roof panel 24. The guide members 70 are moveably fit within the second pair of grooves 72 to allow the roof panel 24 to move along the track guides 28, 30. The second pair of grooves 72 extends longitudinally with the vehicle 10 below the first pair of grooves 68 but at least partly above the top portion 12 of the vehicle 10.

As shown in FIGS. 1–4, the closure assembly 22 further includes a motor 74 accompanied by a pair of cables 76 (e.g., flexible cylindrical metal cables) that are attached to the rear panel 26. Fasteners 78, as best shown in FIG. 6, may be slidably received within the slots 66 of the rigid portions 64 for attachment.

Figure 6:
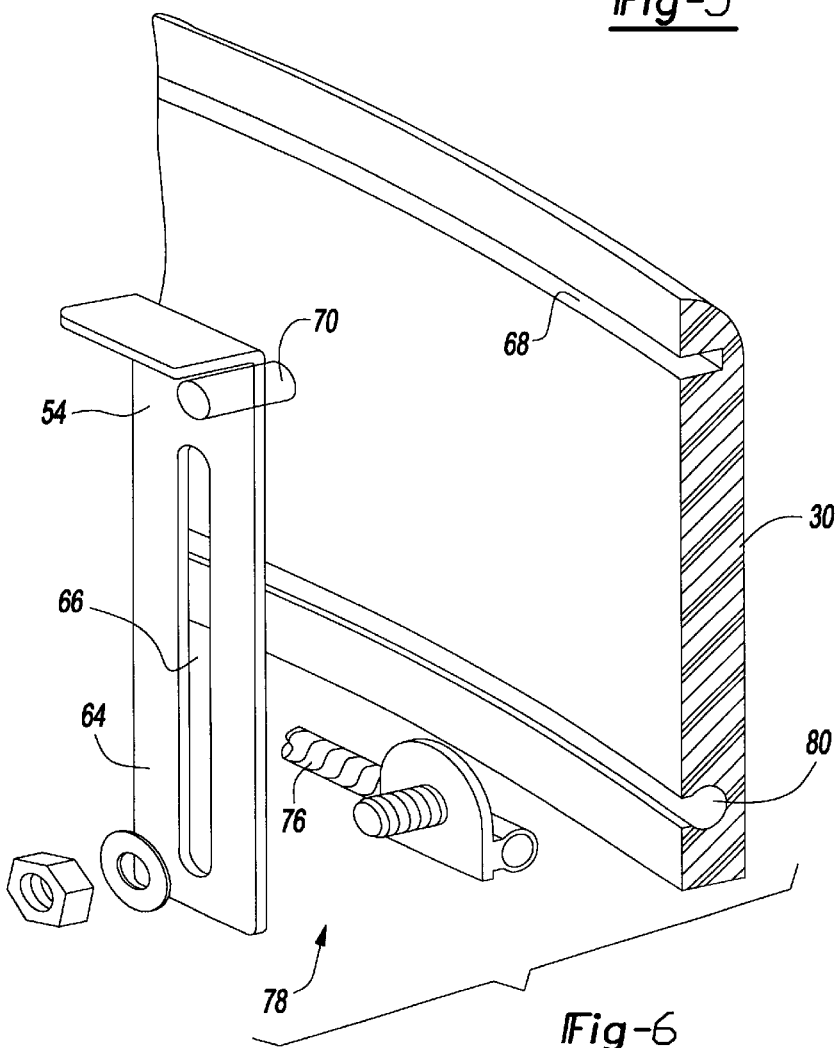
FIG. 6 illustrates an exploded view of the support of FIG. 5.

As shown best in FIG. 6, a channel 80 (only one of which is shown) is defined in each of the track guides 28, 30 and sheaths (not shown) are mounted adjacent the top portion 12 of the vehicle 10, both for receiving and guiding the cables 76. The drive shaft of the motor 74 is suitably configured for engaging grooves or other structures extending about the cables 76 for engagingly driving the cables 76 along the sheaths, channels 80 or both.

To open the lower portion of the rear passageway 32 covered by the rear panel 26, the motor 74 drives the cables 76 into the sheaths. The cables 76 are guided along the channels 80 toward the top portion 12 of the vehicle 10. The cables 76 advance the rear panel 26 along the track guides 28, 30 from its first flush position covering the lower portion of the passageway 32 to a second position above the roof panel 24, the top portion 12 or both, as best shown in FIG. 3. A ramping portion 82 of each of the first pair of grooves 68 guides the rear panel 26 above the roof panel 24. As the rearward supports 54 of the rear panel 26 are guided up the ramping portion 82, the fasteners 78 attaching the cables 76 to the rear panel 26 slide along the slots 66 to allow the rear panel 26 to elevate over the roof panel 24 while the cables 76 move along a relatively constant curvature of the channels 80.

Figure 7:
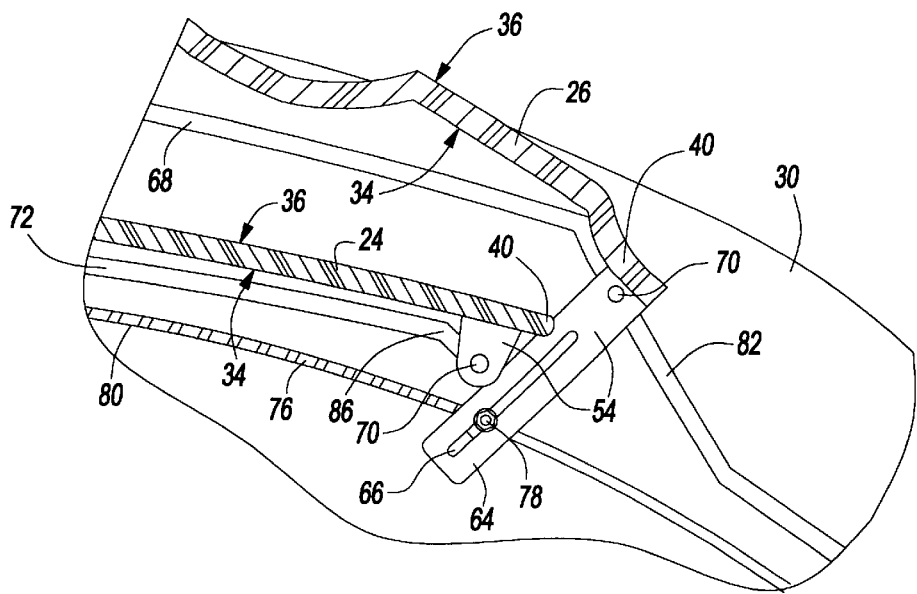
FIG. 7 illustrates a partial sectional side view of the interaction of supports and panels of the rearward closure assembly.

In the second position as best shown in FIGS. 3 and 7, the inwardly facing side 34 of at least a portion of the rear panel 26 is generally parallel to and opposing the outwardly facing side 36 of the roof panel 24 and the trailing edge 40 of the rear panel 26 is generally aligned adjacent the trailing edge 40 of the roof panel 24. Additionally, the elongated portions 64 of the rearward supports 54 frictionally engage the side edges 60, 62 of the roof panel 24 adjacent its trailing edge 40 to releasably secure the roof panel 24 between the elongated portions 64 thereby releasably securing the rear panel 26 to the roof panel 24.

As desired by the operator, the motor 74 may then continue to drive the cables 76 in the same direction to further move the rear panel 26 along the track guides 28, 30 to a further forward position shown in FIG. 4. As the rear panel 26 moves further forward, the roof panel 24 remains secured to the rear panel 26. Thus, the roof panel 24 is moved along the track guides 28, 30 as well. A ramping portion 86 of the second pair of opposing grooves 72 guides the roof panel 24 above the top portion 12 of the vehicle 10 and along the track guides 28, 30 while maintaining the roof panel 24 in generally parallel and opposing relation to at least a portion of the rear panel 26. At the forward position, the inwardly facing sides 34 of the roof and rear panel 24, 26 are generally parallel to and opposing the top portion 12 of the vehicle 10 as shown best in FIG. 4.

To close the passageway 32, the motor 74 drives the cables 76 in an opposite direction out of the sheaths (not shown), into the channels 80 and away from the top portion 12 of the vehicle 10. The rear and roof panels 26, 24 remain releasably secured to each other as they move along the guides 28, 30 toward the passageway 32. The roof panel 24 is returned to its initial flush position in the passageway 32 wherein the second pair of grooves 72 end to prohibit further movement of the roof panel 24 with the rear panel 26. Then, the roof panel 24 is forcibly released from between the portions 64 of the rearward supports 54 of the rear panel 26 as the motor 74 drives the rear panel 26 further along the guides 28, 30 to its initial flush position.

Seals may be used between portions of the vehicle 10, the panels 24, 26 or both to make the rear end closure assembly 22 substantially water tight with respect to sealing the rear passageway 32 when the panels 24, 26 are in their closed position. The motor 74 may be suitably controlled either locally, remotely or otherwise.

As alternatives to the embodiment shown, the locations of the motor, sheaths, channels and other components may be changed for space considerations or other convenience considerations. For example, the motor and sheaths may be placed adjacent or within the rear bumper and more than one motor may be used to separately move different panels. The supports may be altered such as by using supports common to sunroofs that move panels toward and/or away from passageways.

It should be understood that the invention is not limited to the exact embodiment or construction which has been illustrated and described but that various changes may be made without departing from the spirit and the scope of the invention.

What is claimed is:

1. A rearward closure assembly for an automotive vehicle, said vehicle have a top portion, a first and second side portion and a rear portion, said rear portion including a rearward passageway, said closure assembly comprising:
   a) a first track guide extending generally parallel and adjacent to said first side portion of said vehicle and extending from said top portion of said vehicle to said rear portion of said vehicle;
   b) a second track guide extending generally parallel and adjacent to said second side portion of said vehicle and extending from said top portion of said vehicle to said rear portion of said vehicle;

c) a generally rectangular rear panel supported by said first and second track guides;

d) a generally rectangular rearward roof panel supported by said first and second track guides;
   (i) said rear panel moveable along said track guides from a first flush position covering a lower portion of said passageway to a second position generally opposing said roof panel thereby opening said lower portion of said passageway;
   ii) said rear panel further moveable along said track guides from said second position to a third position generally opposing said top portion of said vehicle;
   iii) said roof panel moveable along said track guides from a first flush position covering an upper portion of said passageway to a second position generally opposing said top portion of said vehicle thereby opening said upper portion of said passageway; and e) a motor suitably linked to at least one of said rear and roof panels for assisting in moving said at least one of said rear and roof panels to its respective positions.

2. A closure assembly as in claim 1, wherein said roof panel can be maintained in generally opposing relation to said rear panel as said roof panel and said rear panel move together respectively to their second and third positions.

3. A closure assembly as in claim 1, wherein said rear panel is releasably attached to said roof panel at said second position of said rear panel such that said roof panel is maintained in generally opposing relation to said rear panel as said roof panel and said rear panel move together respectively to their second and third positions.

4. A rearward closure assembly for an automotive vehicle, said vehicle having a top portion, a first and second side portion, a rear portion and a rearward passageway, said closure assembly comprising:

a) a first track guide extending generally parallel and adjacent to said first side portion of said vehicle and extending from said top portion of said vehicle to said rear portion of said vehicle, said first track guide defining a first groove, a second groove and a channel;

b) a second track guide extending generally parallel and adjacent to said second side portion of said vehicle and extending from said top portion of said vehicle to said rear portion of said vehicle, said second track guide also defining a first groove, a second groove and a channel, said first track guide generally opposing said second track guide;

c) a rear panel having a pair of forward supports adjacent a leading edge of said rear panel, and a pair of rearward supports adjacent a trailing edge of said rear panel, each support of said rear panel including a guide member disposed in said first grooves of said first and second track guides for allowing said first and second track guides to moveably support said rear panel;

d) a rearward roof panel having a pair of forward supports adjacent a leading edge of said roof panel and a pair of rearward supports adjacent a trailing edge of said roof panel, each support of said roof panel including a guide member disposed in said second grooves of said first and second track guides for allowing said first and second track guides to support said roof panel;
   i) said rear panel moveable along said track guides from a first flush position covering a lower portion of said passageway wherein said leading edge of said rear panel is adjacent said trailing edge of said roof panel to a second position generally opposing and parallel to said roof panel with said trailing edge of said roof panel adjacent said trailing edge of said rear panel thereby opening said lower portion of said passageway;
   ii) said rear panel further moveable along said track guides from said second position to a third position generally parallel to and opposing said top portion of said vehicle;
   iii) said roof panel moveable with said rear panel from a first flush position covering an upper portion of said passageway to a second position generally parallel to and opposing said top portion of said vehicle thereby opening said upper portion of said passageway;

e) a pair of flexible cables disposed in said channels within said first track guide and said second track guide, said flexible cables suitably attached to said rear panel; and f) a motor suitably configured to move said cables along said channels to move said rear panel between said first, second and third positions of said rear panel.

5. A closure assembly as in claim 4, wherein said roof panel can be maintained in generally opposing relation to said rear panel as said roof panel and said rear panel move together respectively to their second and third positions.

6. A closure assembly as in claim 4, wherein said rear panel is releasably attached to said roof panel at said second position of said rear panel such that said roof panel is maintained in generally opposing relation to said rear panel as said roof panel and said rear panel move together respectively to their second and third positions.

* * * * *